United States Patent
Mizuguchi et al.

(10) Patent No.: US 10,808,798 B2
(45) Date of Patent: Oct. 20, 2020

(54) MOTOR CONTROL DEVICE

(71) Applicant: AISIN SEIKI KABUSHIKI KAISHA, Kariya-shi, Aichi-ken (JP)

(72) Inventors: Hirotaka Mizuguchi, Kariya (JP); Satoshi Kokubo, Nagoya (JP)

(73) Assignee: AISIN SEIKI KABUSHIKI KAISHA, Kariya-Shi, Aichi-Ken (JP)

( * ) Notice: Subject to any disclaimer, the term of this patent is extended or adjusted under 35 U.S.C. 154(b) by 0 days.

(21) Appl. No.: 16/532,793

(22) Filed: Aug. 6, 2019

(65) Prior Publication Data

US 2020/0049229 A1 Feb. 13, 2020

(30) Foreign Application Priority Data

Aug. 13, 2018 (JP) .................................. 2018-152498

(51) Int. Cl.
| | | |
|---|---|---|
| F16F 15/22 | (2006.01) | |
| H02K 7/00 | (2006.01) | |
| F16F 7/10 | (2006.01) | |
| B60W 10/02 | (2006.01) | |
| B60K 6/38 | (2007.10) | |
| B60W 30/188 | (2012.01) | |
| B60L 15/20 | (2006.01) | |

(52) U.S. Cl.
CPC .............. *F16F 15/223* (2013.01); *B60K 6/38* (2013.01); *B60W 10/02* (2013.01); *B60W 30/188* (2013.01); *F16F 7/1005* (2013.01); *H02K 7/006* (2013.01); *B60L 15/20* (2013.01)

(58) Field of Classification Search
CPC ............................... H02K 7/006; F16F 15/223
USPC ........................................................ 318/34, 3
See application file for complete search history.

(56) References Cited

U.S. PATENT DOCUMENTS

| | | | |
|---|---|---|---|
| 5,185,543 A | 2/1993 | Tebbe | |
| 8,548,684 B2* | 10/2013 | Kurishige | ............ B62D 5/0463 |
| | | | 701/42 |
| 2019/0047546 A1 | 2/2019 | Asai et al. | |

FOREIGN PATENT DOCUMENTS

| | | |
|---|---|---|
| JP | H04211747 A | 8/1992 |
| JP | 2009029348 A | 2/2009 |
| JP | 2017100580 A | 6/2017 |
| JP | 2017100581 A | 6/2017 |
| JP | 2018095169 A | 6/2018 |

(Continued)

*Primary Examiner* — David Luo
(74) *Attorney, Agent, or Firm* — Buchanan Ingersoll & Rooney PC

(57) ABSTRACT

A motor control device of a vehicle including an engine and a motor generator, a transmission transmitting an engine torque and/or a motor torque to a wheel, and a damper reducing vibration of a crankshaft of the engine includes: a damper torque calculation unit calculating a damper torque generated by the damper according to fluctuation in engine torque based on a difference between a crank angle and a motor angle; a reverse-phase torque calculation unit calculating a reverse-phase torque with a reverse phase to the damper torque; a correction amount calculation unit calculating a first value calculated at least based on the crank angle and the motor angle; and a motor torque command output unit outputting a motor torque command given to the motor generator based on the reverse-phase torque corrected by the correction amount.

10 Claims, 12 Drawing Sheets

(56) References Cited

FOREIGN PATENT DOCUMENTS

| JP | 2018095172 A | 6/2018 |
|----|--------------|--------|
| JP | 2019031196 A | 2/2019 |

* cited by examiner

MOTOR CONTROL DEVICE

CROSS REFERENCE TO RELATED APPLICATIONS

This application is based on and claims priority under 35 U.S.C. § 119 to Japanese Patent Application 2018-152498, filed on Aug. 13, 2018, the entire contents of which are incorporated herein by reference.

TECHNICAL FIELD

This disclosure relates to a motor control device.

BACKGROUND DISCUSSION

In the related art, a vehicle is known which includes an engine and a motor generator as power sources, and a transmission for transmitting a drive torque based on at least one of an engine torque of the engine and a motor torque of the motor generator to a wheel side at a selected gear ratio, and a damper for reducing vibration of a crankshaft of the engine. Further, there is known a technique for reducing the vibration generated in accordance with a torsional torque by outputting the motor torque in an opposite phase to the torsional torque generated by the damper to offset the torsional torque. See, for example, JP 2009-293481A (Reference 1) and JP 04-211747A (Reference 2).

However, a general damper has a structure to reduce vibration by means of an elastic member and a friction material. Therefore, a damper torque generated by the general damper includes not only a torsional torque generated by the elastic member but also a hysteresis torque generated by the friction material.

On the other hand, in the related art, only the torsional torque is offset by the motor torque, and the hysteresis torque is not offset. Therefore, in the related art, it is impossible to reduce the vibration generated according to a phase shift of a motor torque generated due to the hysteresis torque.

Thus, a need exists for a motor control device which is not susceptible to the drawback mentioned above.

SUMMARY

A motor control device of a vehicle according to an aspect of this disclosure includes an engine and a motor generator as power sources, a transmission configured to transmit a driving torque based on at least one of an engine torque of a crankshaft of the engine and a motor torque of a motor shaft of the motor generator to a wheel at a selected gear ratio, and a damper configured to reduce vibration of the crankshaft by an elastic member and a friction material, the motor control device including: a damper torque calculation unit configured to calculate a damper torque including a torsional torque and a hysteresis torque generated by the damper according to fluctuation in engine torque based on a difference between a crank angle as a rotation angle of the crankshaft and a motor angle as a rotation angle of the motor shaft; a reverse-phase torque calculation unit configured to calculate a reverse-phase torque with a reverse phase to the damper torque based on the damper torque; a correction amount calculation unit configured to calculate a first value corresponding to a phase shift of the motor torque generated due to the hysteresis torque, which is calculated at least based on the crank angle and the motor angle as a correction amount of the phase of the reverse-phase torque; and a motor torque command output unit configured to output a motor torque command given to the motor generator based on the reverse-phase torque whose phase is corrected by the correction amount.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Hereinafter, some embodiments of this disclosure will be described based on drawings. Configurations of embodiments disclosed below and operations and results (effects) caused by the corresponding configurations are merely examples and are not limited to the following disclosed contents.

First Embodiment

Figure 1:
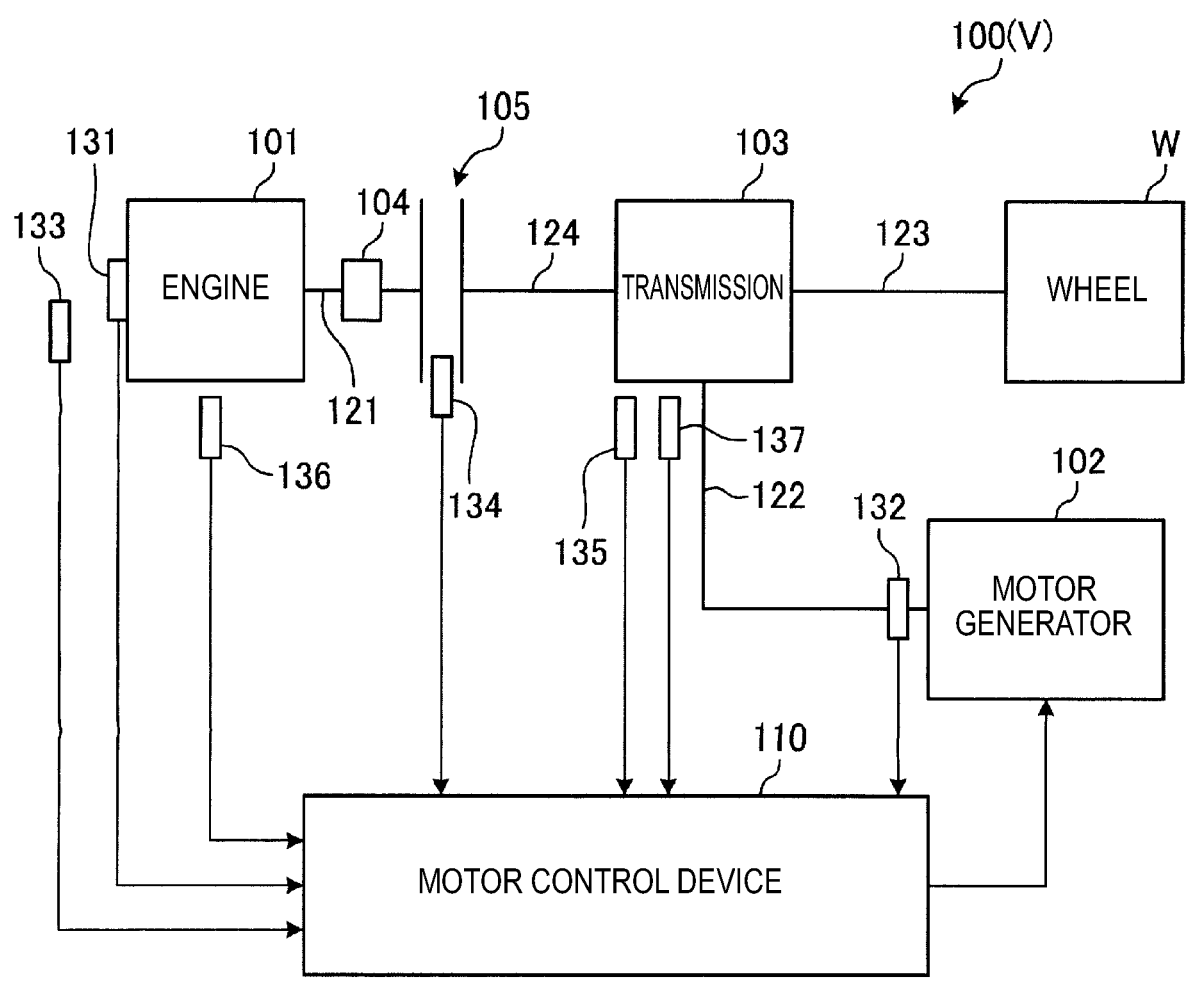
FIG. 1 is an exemplary schematic block diagram illustrating a configuration of a drive system of a vehicle including a motor control device according to a first embodiment.

FIG. 1 is an exemplary schematic block diagram illustrating a configuration of a drive system 100 of a vehicle V including a motor control device 110 according to a first embodiment.

As illustrated in FIG. 1, the drive system 100 of the vehicle V according to the first embodiment includes an engine 101, a motor generator 102, a transmission 103, a damper 104, a clutch 105, and the motor control device 110.

The engine 101 and the motor generator 102 are power sources of the vehicle V. The engine 101 outputs an engine torque according to control of an engine ECU (not illustrated) to rotate a crankshaft 121. Similarly, the motor generator 102 outputs a motor torque according to the control of the motor control device 110 to rotate a motor shaft 122.

The transmission 103 transmits a drive torque based on at least one of the engine torque of the crankshaft 121 of the engine 101 and the motor torque of the motor shaft 122 of the motor generator 102 to a wheel W at a selected gear ratio. The drive torque is transmitted to the wheel W through a drive shaft 123.

The damper 104 is a torque fluctuation absorber that reduces (absorbs) vibration (fluctuation in engine torque) of the crankshaft 121. The damper 104 has an elastic member and a friction material similarly to a general damper and generates a damper torque including a torsional torque and a hysteresis torque according to the fluctuation in engine torque.

The clutch 105 is installed between the engine 101 and the transmission 103, and switches connection/disconnection between the crankshaft 121 of the engine 101 and an input shaft 124 of the transmission 103. The clutch 105 performs transmission of (at least a part of) a torque between the crankshaft 121 and the input shaft 124 in the case of a connection state where the crankshaft 121 and the input shaft 124 are connected, and interrupts transmission of the torque between the crankshaft 121 and the input shaft 124 in the case of an disconnection state where the connection between the crank shaft 121 and the input shaft 124 is disconnected.

The motor control device 110 is, for example, an electronic control unit (ECU) configured as a microcomputer including a processor or a memory. The motor control device 110 controls the motor torque of the motor generator 102 by giving to the motor generator 102 a motor torque command as a command value.

The motor control device 110 may use various sensors installed in the vehicle V for the control. In the example illustrated in FIG. 1, as various sensors, a crank angle sensor 131, a motor angle sensor 132, an accelerator position sensor 133, a clutch position sensor 134, a shift position sensor 135, and an engine oil temperature sensor 136, and a transmission oil temperature sensor 137 are exemplified.

The crank angle sensor 131 detects the crank angle as a rotation angle of the crank shaft 121. The motor angle sensor 132 detects the motor angle as the rotation angle of the motor shaft 122.

The accelerator position sensor 133 detects an operation amount (operation position), etc., of an acceleration operation unit (not illustrated) for performing an acceleration operation to accelerate the vehicle V, such as an accelerator pedal to detect whether the acceleration operation is performed by a driver, for example. The clutch position sensor 134 detects the operation amount (operation position), etc., of a clutch operation unit (not illustrated) for operating the clutch 105, such as a clutch pedal to detect whether the clutch 105 is in the connection state or the disconnection state.

The shift position sensor 135 detects a shift stage currently set in the transmission 103. The engine oil temperature sensor 136 detects a temperature of engine oil in the engine 101. The transmission oil temperature sensor 137 detects the temperature of transmission oil in the transmission 103.

However, in the related art, in a configuration provided with a general damper such as the damper 104 according to the first embodiment, a technology is known which reduces the vibration caused by the torsional torque by outputting the motor torque in a reverse phase to the torsional torque generated by the damper.

However, since a general damper such as the damper 104 according to the first embodiment has a structure to reduce the vibration by the elastic member and the friction material, the damper torque generated by the general damper includes even the hysteresis torque generated by the friction material in addition to the torsional torque generated by the elastic member.

In this regard, in the related art, the hysteresis torque is not considered. Therefore, even if the related art is applied as it is to the drive system 100 according to the first embodiment, only the torsional torque is offset by the motor torque and the hysteresis torque is not offset, and as a result, even the vibration generated by the shift of the phase of the motor torque generated due to the hysteresis torque as illustrated in FIGS. 2A and 2B below may not be reduced.

Figure 2A:
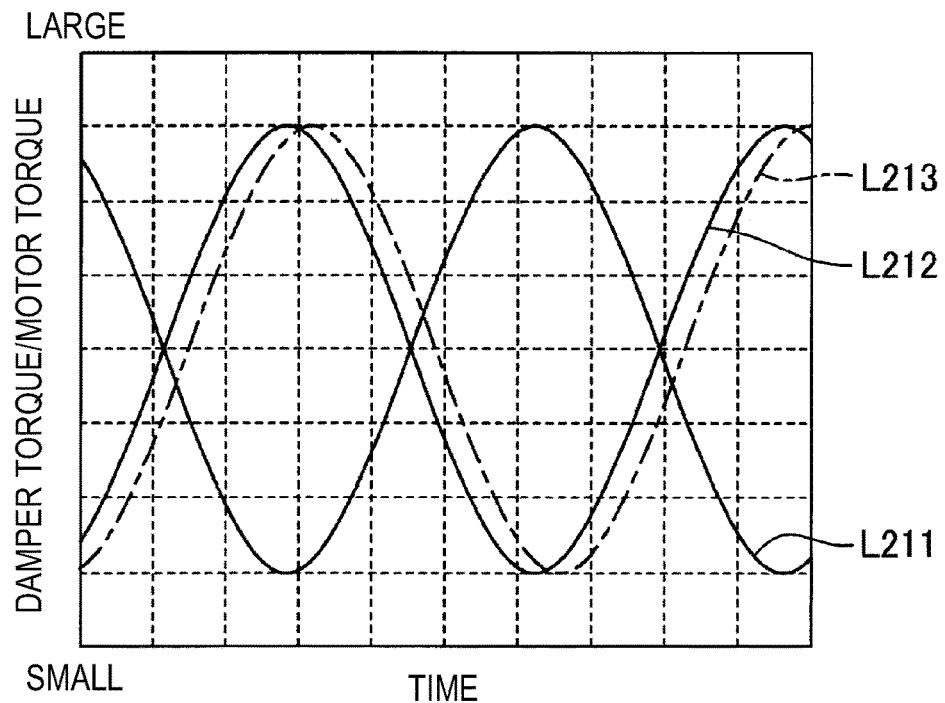
FIGS. 2A and 2B are exemplary schematic diagrams illustrating an example of a shift of a phase of a motor torque generated due to a hysteresis torque and vibration generated by the shift of the corresponding phase, which should be considered in the first embodiment.
Figure 2B:
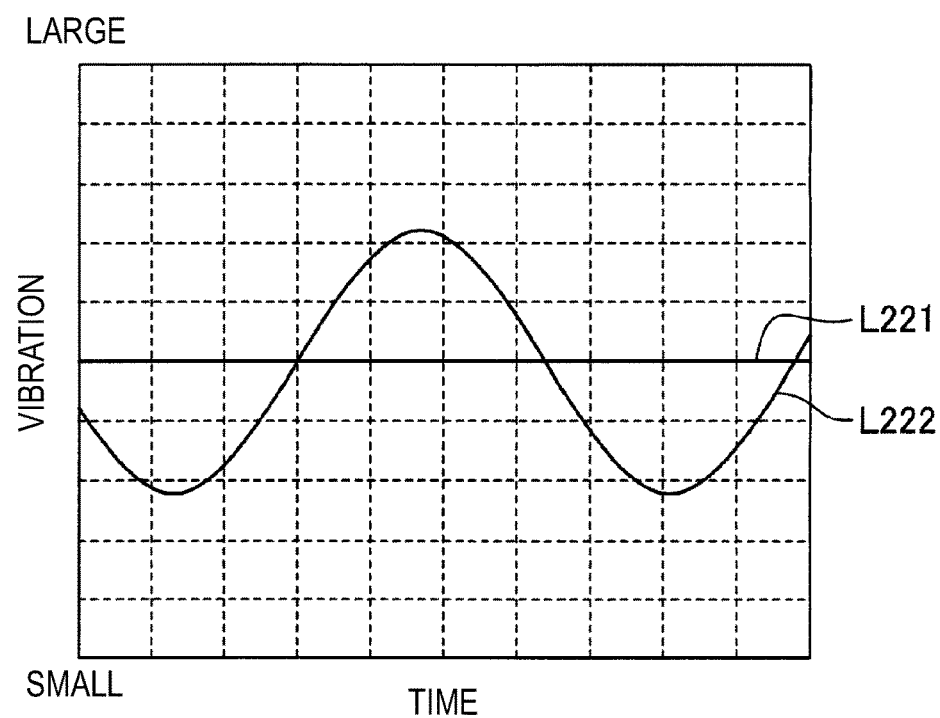

FIGS. 2A and 2B are exemplary schematic diagrams illustrating an example of a shift of a phase of a motor torque generated due to a hysteresis torque and vibration generated by the shift of the corresponding phase, which should be considered in the first embodiment.

First, a situation in which only the torsional torque is generated and the hysteresis torque is not generated is virtually considered. In such a virtual situation, when a time change of the damper torque is illustrated by a solid line L211 of FIG. 2A, the time change of the motor torque is controlled in an opposite phase to the time change of the damper torque like a solid line L212 of FIG. 2A, both the damper torque and the motor torque are offset to set the vibration of the drive shaft 123 to a constant value as indicated by a solid line L221 of FIG. 2B.

However, when the hysteresis torque is considered, even if the time change of the motor torque is controlled in the opposite phase to the time change of the damper torque as in the above virtual situation, the shift (delay) of the phase caused by the hysteresis torque occurs in the motor torque, and as a result, the time change of the motor torque is indicated as an alternated long and short dash line L213 of FIG. 2A. In this case, since the damper torque and the motor torque are not sufficiently offset, the vibration of the drive shaft 123 remains to some extent as a vibration component as indicated by a solid line L222 of FIG. 2B.

As described above, in order to reduce the vibration of the drive shaft 123 generated according to the damper torque in a situation where both the torsional torque and the hysteresis torque are generated as the damper torque, in consideration of both the torsional torque and the hysteresis torque, the motor torque for offsetting the damper torque needs to be determined.

Therefore, the motor control device 110 according to the first embodiment executes a predetermined control program stored in a memory or the like by the processor, and implements the function module group illustrated in FIG. 3 below in the motor control device 110 to implement reduction of the vibration generated according to the damper torque.

Figure 3:
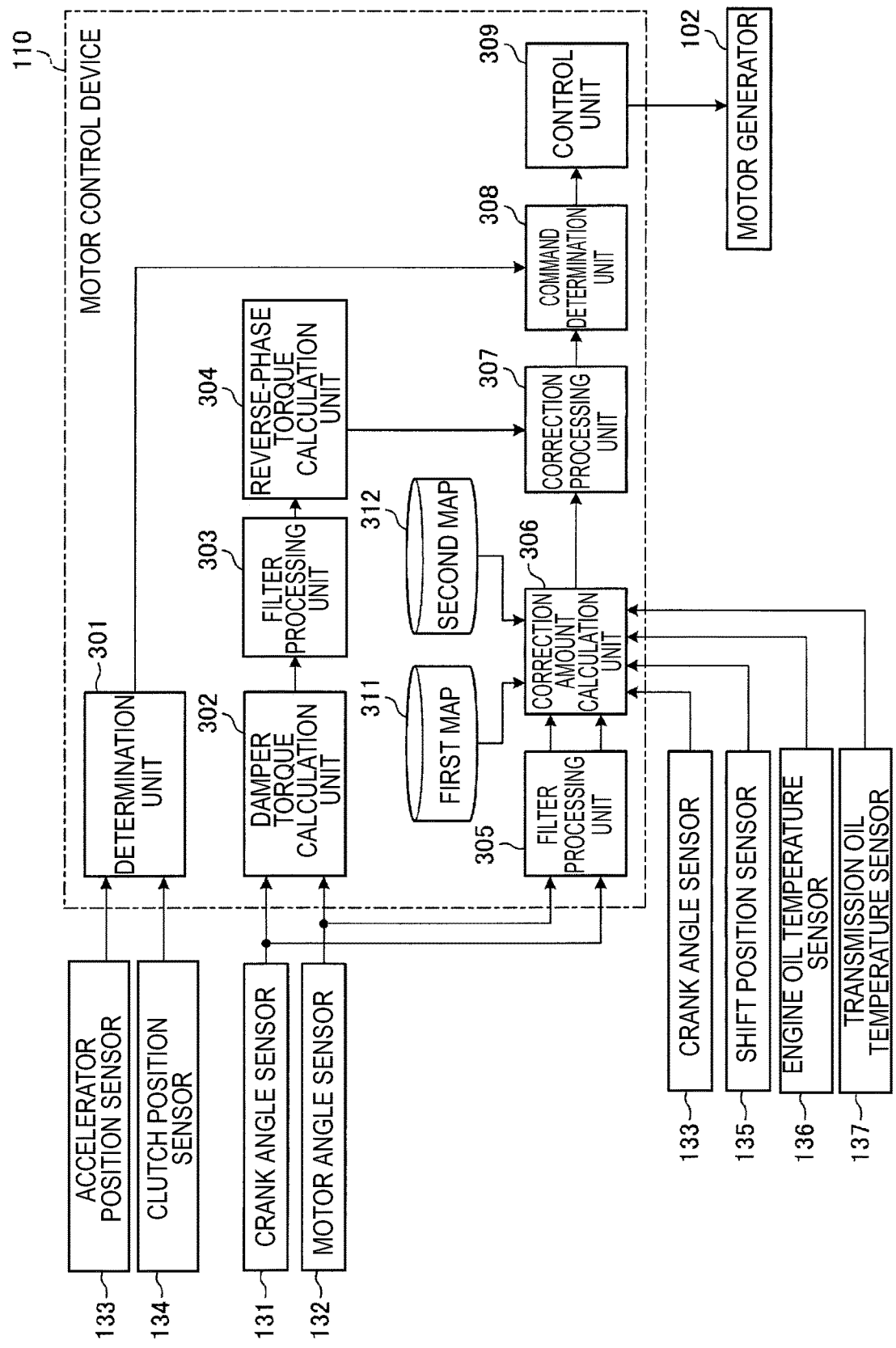
FIG. 3 is an exemplary schematic block diagram illustrating a function module group of a motor control device according to the first embodiment.

FIG. 3 is an exemplary schematic block diagram illustrating a function module group of a motor control device 110 according to the first embodiment.

As illustrated in FIG. 3, the motor control device 110 includes a determination unit 301, a damper torque calculation unit 302, a filter processing unit 303, a reverse-phase torque calculation unit 304, a filter processing unit 305, a correction amount calculation unit 306, a correction processing unit 307, a command determination unit 308, and a control unit 309. Further, in the first embodiment, a part or the entirety of the function module group may be implemented by a dedicated hardware (circuit).

As illustrated in FIG. 3, the motor control device 110 includes a first map 311 and a second map 312 as data used for the control.

The determination unit 301 determines whether the output of the motor torque for reducing the vibration of the drive shaft 123 is required by offsetting the damper torque based on detection results of the accelerator position sensor 133 and the clutch position sensor 134. Further, hereinafter, the motor torque for reducing the vibration of the drive shaft 123 may be expressed as a damping torque.

For example, when the clutch 105 is in the disconnection state or when the acceleration operation is not performed even though the clutch 105 is in the connection state, the fluctuation in engine torque is not transmitted to the drive shaft 123, and as a result, the damping torque need not be output. Accordingly, in this case, the determination unit 301 notifies a gist that the damping torque need not be output to the command determination unit 308 so that the damping torque becomes zero.

Meanwhile, when the clutch 105 is in the connection state and the acceleration operation is performed, the fluctuation in engine torque is transmitted to the driver shaft 123, and as a result, the vibration needs to be reduced by the damping torque. Accordingly, in this case, the determination unit 301 notifies the gist that the damping torque need to be output to the command determination unit 308 so as to output the damping torque for offsetting the damper torque.

The damper torque calculation unit 302 calculates (estimates) the damper torque generated by the damper 104 based on the detection results of the crank angle sensor 131 and the motor angle sensor 132. Assuming that the crank angle as the detection result of the crank angle sensor 131 is θ1 and the motor angle as the detection result of the motor angle sensor 132 is θ2, a torsion angle of the damper 104 may be calculated based on a difference between θ1 and θ2. Then, assuming that a spring constant of the elastic member of the damper 104 is K, the damper torque may be calculated based on a multiplication of K with the torsion angle of the damper 104 represented by (θ1−θ2).

The filter processing unit 303 performs filtering processing on the calculation result of the damper torque calculation unit 302, and extracts a vibration component corresponding to a primary frequency of explosion of the engine 101. The filter processing unit 303 implements such extraction processing by, for example, a band pass filter having a frequency band corresponding to the primary frequency of explosion of the engine 101 as a pass band.

The reverse phase torque calculation unit 304 executes a phase inversion process for an extraction result of the filter processing unit 303 to calculate a reverse phase torque of a reverse phase to the damper torque which becomes a basis of calculation of the damping torque.

The filter processing unit 305 performs filtering processing on the detection results of the crank angle sensor 131 and the motor angle sensor 132 to extract the vibration component corresponding to the primary frequency of explosion of the engine 101. Similarly to the filter processing unit 303, the filter processing unit 305 implements such extraction processing by, for example, the band pass filter having the frequency band corresponding to the primary frequency of explosion of the engine 101 as the pass band.

The correction amount calculation unit 306 calculates a first value corresponding to the shift of the phase of the motor torque generated due to the hysteresis torque and calculates the corresponding first value as a correction amount of the phase of the reverse phase torque, based on the extraction result of the filter processing unit 305 and the detection results of the accelerator position sensor 133, the shift position sensor 135, the engine oil temperature sensor 136, and the transmission oil temperature sensor 137. Further, hereinafter, the first value may be expressed as a correction phase difference.

More specifically, the correction amount calculation unit 306 calculates the correction phase difference based on a difference between a second value corresponding to the phase difference between the crank angle and the motor angle assumed when it is assumed that the hysteresis torque is not generated and a third value corresponding to a phase difference between the vibration components of the crank angle and the motor angle corresponding to the primary frequency of explosion of the engine 101. Further, hereinafter, the second value may be expressed as a standard phase difference and the third value may be expressed as an actual phase difference.

The actual phase difference may be calculated based on the extraction result of the filter processing unit 305. That is, as described above, since the filter processing unit 305 extracts the vibration component corresponding to the primary frequency of explosion of the engine 101 of each of the crank angle as the detection result of the crank angle sensor 131 and the motor angle as the detection result of the motor angle sensor 132, the correction amount calculation unit 306 compares the extraction results to calculate the actual phase difference.

Figure 4:
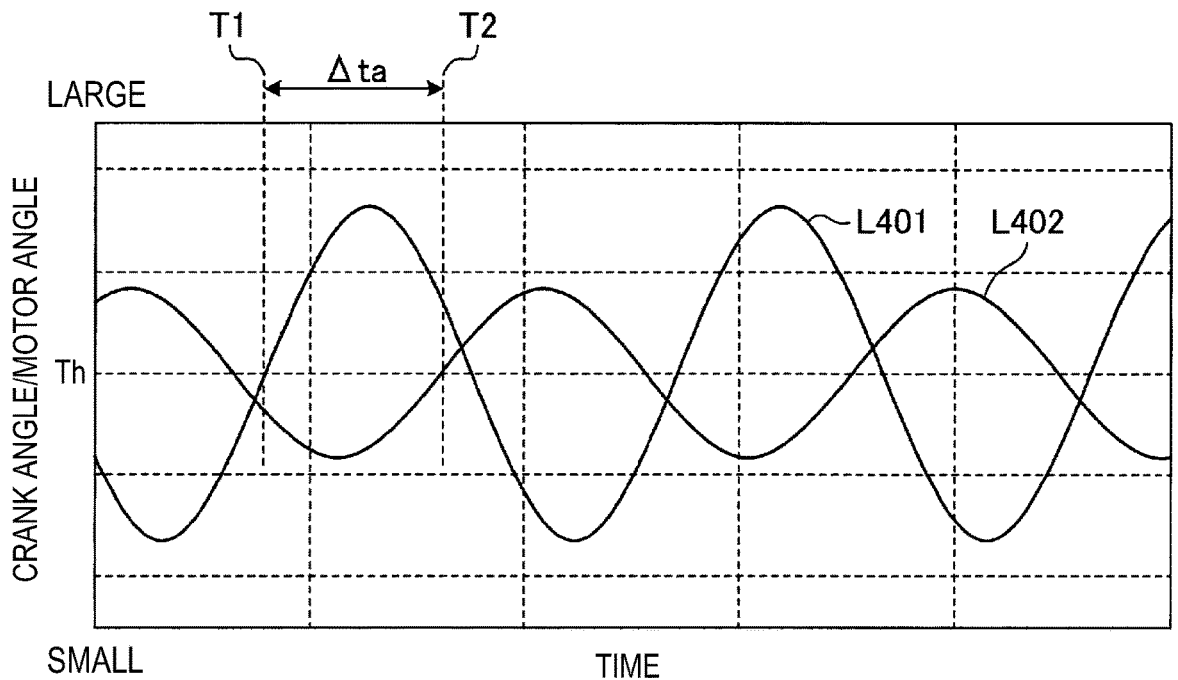
FIG. 4 is an exemplary schematic diagram illustrating an example of a phase difference between a crank angle and a motor angle in the first embodiment.

FIG. 4 is an exemplary schematic diagram illustrating an example of a phase difference between a crank angle and a motor angle in the first embodiment. In FIG. 4, a solid line L401 represents the time change of the vibration component of the crank angle corresponding to the primary frequency of the explosion of the engine 101 and a solid line L402 represents the time change of the vibration component of the motor angle corresponding to the primary frequency of the explosion of the engine 101.

As illustrated in FIG. 4, a predetermined time difference Δta (=T1−T2) is present between a timing T1 at which the crank angle exceeds a predetermined threshold Th and a timing T2 at which the motor angle exceeds the predetermined threshold Th. The correction amount calculation unit 306 acquires the time difference Δta based on the extraction result of the filter processing unit 305 and calculates the actual phase difference based on the corresponding time difference Δta. Further, the actual phase difference may be calculated based on a difference between a timing when the crank angle is less than the predetermined threshold Th and a timing when the motor angle is less than the predetermined threshold Th. The calculated actual phase difference corresponds to an actual phase difference between the crank angle and the motor angle considering influences of both the torsional torque and the hysteresis torque.

Meanwhile, the standard phase difference may be calculated based on the detection results of the accelerator position sensor 133, the shift position sensor 135, the engine oil temperature sensor 136, and the transmission oil temperature sensor 137 and the first map 311 and the second map 312 illustrated in FIGS. 5 and 6 below.

Figure 5:
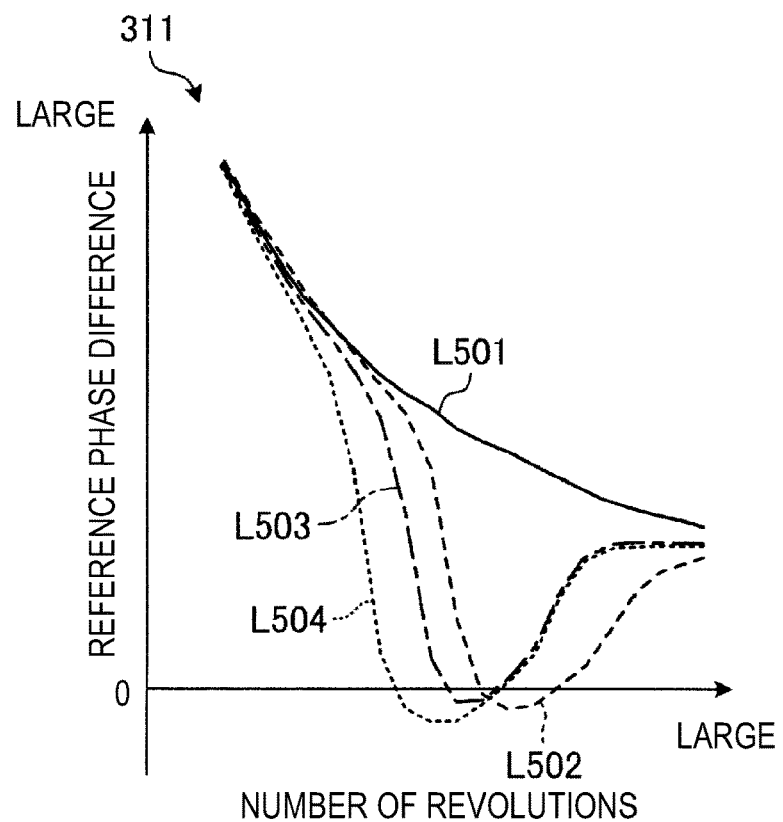
FIG. 5 is an exemplary schematic diagram illustrating an example of a first map according to the first embodiment.

FIG. 5 is an exemplary schematic diagram illustrating an example of the first map 311 according to the first embodiment. As illustrated in FIG. 5, the first map 311 which represents a relationship between the number of revolutions of the engine 101, the shift stage of the transmission 103, and a fourth value which becomes the basis of the calculation of the standard phase difference, is predetermined data. Further, hereinafter, the fourth value may be expressed as a reference phase difference.

In the example illustrated in FIG. 5, the relationship between the number of revolutions of the engine 101 and the reference phase difference is defined as a plurality of lines L501 to L504 corresponding to steps of the shift stage. More specifically, in the example illustrated in FIG. 5, the line L501 representing the relationship between the number of revolutions of the engine 101 and the reference phase difference in the shift stage of low to medium speeds (for example, first to third speeds), the line L502 representing the relationship between the number of revolutions of the engine 101 and the reference phase difference in a shift stage higher than the corresponding line L501 (for example, fourth speed), the line L503 representing the relationship between the number of revolutions of the engine 101 and the reference phase difference in a shift stage higher than the line L502 (for example, fifth speed), and the line L504 representing the relationship between the number of revolutions of the engine 101 and the reference phase difference in a shift stage at a highest speed (for example, sixth speed) are defined.

According to the example illustrated in FIG. 5, a line corresponding to the shift stage acquired based on the detection result of the shift position sensor 135 is selected from the lines L501 to L504 and a point corresponding to the number of revolutions of the engine 101 acquired based on the detection result of the crank angle sensor 131 is extracted thereon to easily calculate the reference phase difference. In the first embodiment, the standard phase difference may be calculated by correcting the reference phase difference by a (first) correction coefficient calculated based on the second map 312 illustrated in FIG. 6 below.

Figure 6:
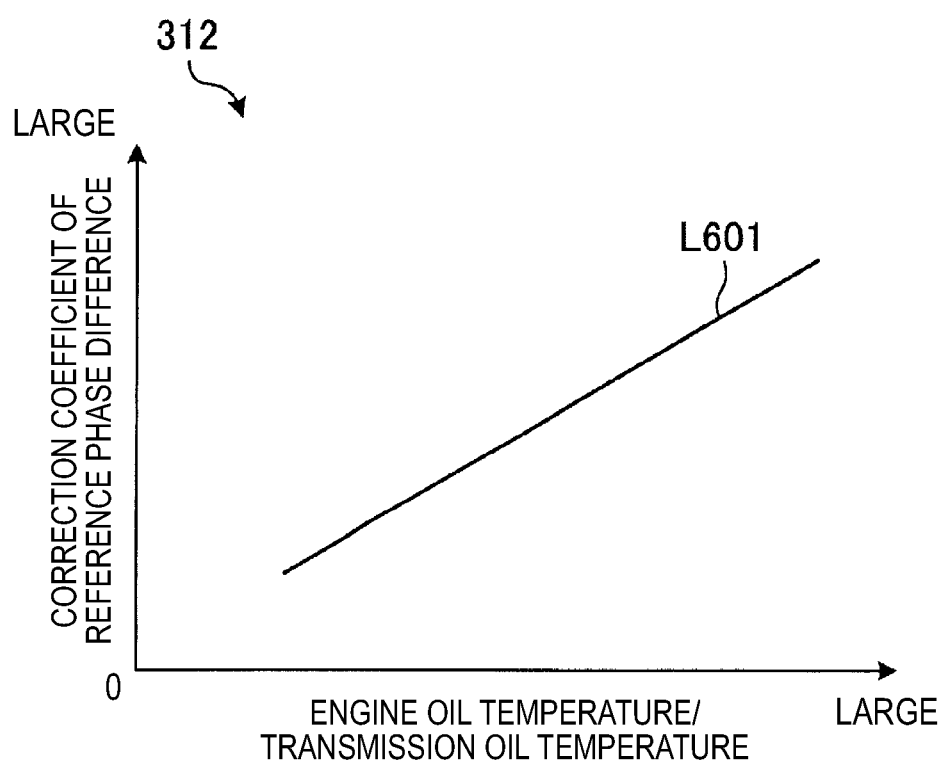
FIG. 6 is an exemplary schematic diagram illustrating an example of a second map according to the first embodiment.

FIG. 6 is an exemplary schematic diagram illustrating an example of the second map 312 according to the first embodiment. As illustrated in FIG. 6, the second map 312 represents data indicating the relationship between a temperature of oil of the engine 101 and the temperature of the oil of the transmission 103, and a correction coefficient for correcting the reference phase difference.

In the example illustrated in FIG. 6, the relationship between the temperature of the oil of the engine 101/the temperature of the oil of the transmission 103 and the correction coefficient is defined as a solid line L601. According to the example illustrated in FIG. 6, the correction coefficient of the reference phase difference may be easily calculated by extracting a point corresponding to the temperature of the oil of the engine 101/the temperature of the oil of the transmission 103 from the solid line L601. Further, the temperature of the oil of the engine 101/the temperature of the oil of the transmission 103 is acquired based on the detection result of the engine oil temperature sensor 136/the transmission oil temperature sensor 137. In the first embodiment, the reference phase difference is multiplied by the calculated correction coefficient to calculate the standard phase difference.

In the example illustrated in FIG. 6, the relationship between the temperature of the oil of the engine 101 and the correction coefficient and the relationship between the temperature of the oil of the transmission 103 and the correction coefficient are seemed to be expressed as the same data (solid line L601) and such an expression is just for simplification of description. For example, in the first embodiment, the second map 312 may be separately set as two types of data as data representing the relationship between the temperature of the oil of the engine 101 and the correction coefficient and as data representing the relationship between the temperature of the oil of the transmission 103 and the correction efficient. Further, in the first embodiment, when the two types of data are defined by a straight line such as the solid line L601, a slope of a straight line representing the relationship between the temperature of the oil of the engine 101 and the correction coefficient and the slope of a straight line representing the relationship between the temperature of the oil of the transmission 103 and the correction coefficient may be different from each other.

As described above, in the first embodiment, the correction amount calculation unit 306 calculates the standard phase difference by multiplying the reference phase difference acquired by referring to the first map 311 based on the number of revolutions of the engine 101 and the shift stage of the transmission 103 by the correction coefficient acquired by referring to the second map 312 based on the temperature of the oil of the engine 101 and the temperature of the oil of the transmission 103.

Then, in the first embodiment, the correction amount calculation unit 306 calculates the correction phase difference based on the difference between the standard phase difference and the actual phase difference calculated as described above. As described above, the standard phase difference corresponds to an assumed phase difference between the crank angle and the motor angle that takes into account only the effect of the torsional torque, which is assumed when it is assumed that no hysteresis torque is generated and the actual phase difference corresponds to an actual phase difference between the crank angle and the motor angle that considers the influences of both the torsional torque and the hysteresis torque. Accordingly, when the standard phase difference is set to $\Delta t1$ and the actual phase difference is set to $\Delta t2$, a correction phase difference calculated by an equation such as $(\Delta t1 - \Delta t2)$ representing the difference between the standard phase difference and the actual phase difference corresponds to the shift (delay) of the phase of the motor torque generated due to only the hysteresis torque in the damper torque.

Referring back to FIGS. 2A and 2B, the correction processing unit 307 corrects the reverse-phase torque calculated by the reverse-phase torque calculation unit 304 based on the correction phase difference calculated by the correction amount calculation unit 306. More specifically, the correction processing unit 307 shifts (delays) the phase of the reverse-phase torque by the correction phase difference. As a result, it is possible to calculate the damping torque as the motor torque that may offset the damper torque including even the phase shift caused by the hysteresis torque.

When the determination unit 301 determines that the damping torque needs to be output, the command determination unit 308 determines a motor torque command given to the motor generator 102 based on the damping torque calculated by the correction processing unit 307. In addition, the control unit 309 drives the motor generator 102 based on the motor torque command determined by the command determination unit 308. As described above, the command determination unit 308 and the control unit 309 serve as a motor torque command output unit that outputs the motor torque command given to the motor generator 102 based on the reverse-phase torque whose phase is corrected by the correction phase difference.

Based on the above configuration, the motor control device 110 according to the first embodiment executes processing according to processing flows illustrated in FIGS. 7 and 8 below.

Figure 7:
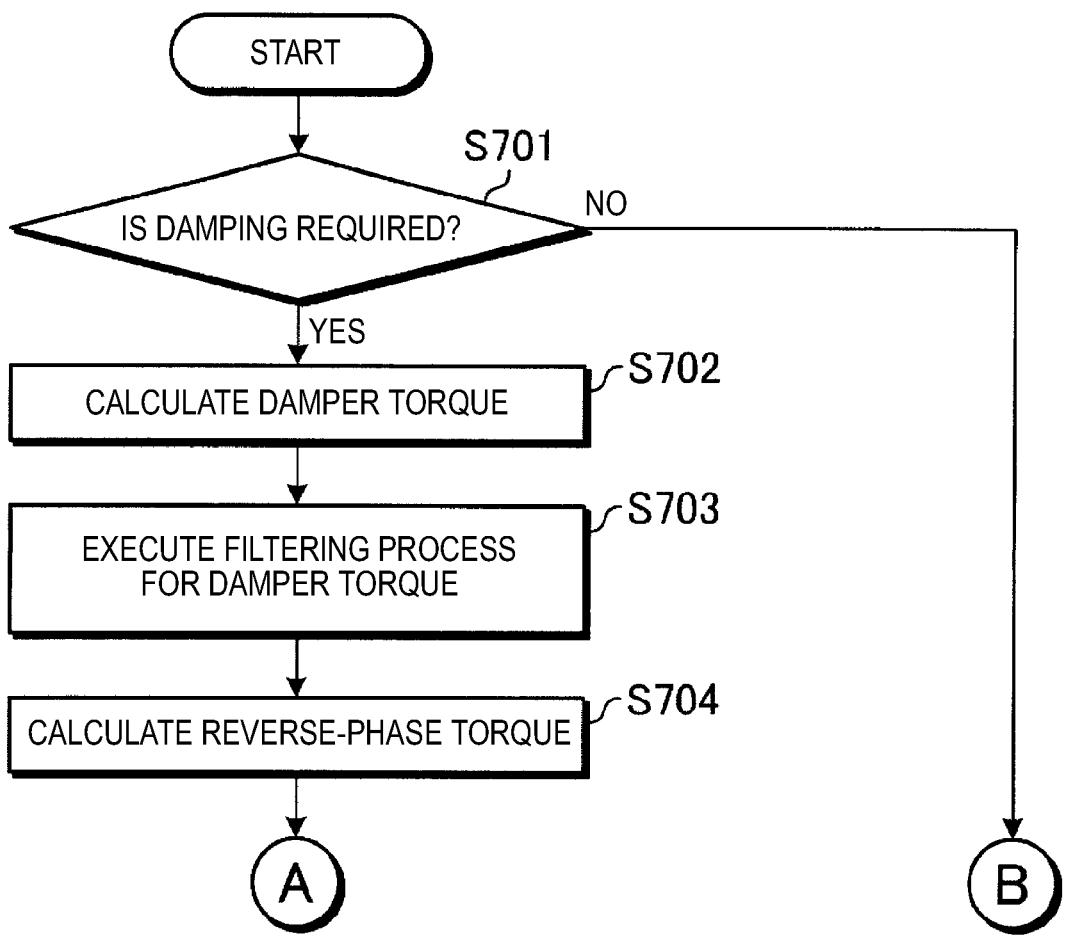
FIG. 7 is an exemplary schematic flowchart illustrating a first half part of a series of processes executed by the motor control device according to the first embodiment.

FIG. 7 is an exemplary schematic flowchart illustrating a first half part of a series of processes executed by the motor control device 110 according to the first embodiment. Further, FIG. 8 is an exemplary schematic flowchart illustrating a second half of a series of processes executed by the motor control device 110 according to the first embodiment.

As illustrated in FIG. 7, in the first embodiment, first, in S701, the determination unit 301 of the motor control device 110 determines whether damping by the damping torque is required. As described above, the determination is performed based on the detection result of the accelerator position sensor 133 and the detection result of the clutch position sensor 134.

When it is determined in S701 that damping is required, the process proceeds to S702. In addition, in S702, the damper torque calculation unit 302 of the motor control device 110 calculates the damper torque by the calculation based on the detection result of the crank angle sensor 131, the detection result of the motor angle sensor 132, and a spring constant of the elastic member of the damper 104.

Then, in S703, the filter processing unit 303 of the motor control device 110 executes a filtering process on the damper torque calculated in S702. The filtering process executed in S703 is a process of extracting the vibration component corresponding to the primary frequency of the explosion of the engine 101 from the damper torque.

Then, in S704, the reverse-phase torque calculation unit 304 of the motor control device 110 calculates the reverse-phase torque in the reverse phase to the damper torque by executing, for example, the phase inversion process on the result of the process in S703.

Figure 8:
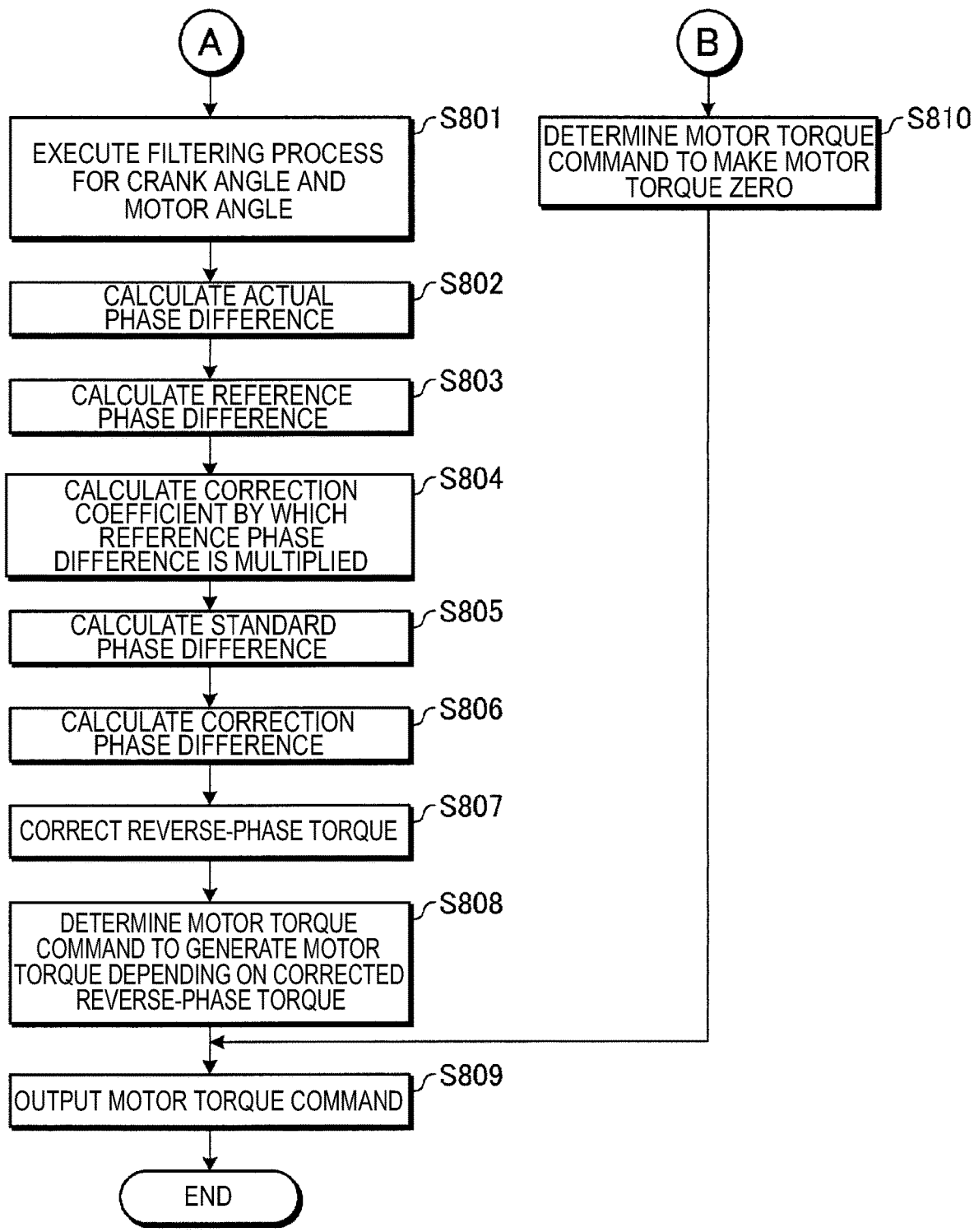
FIG. 8 is an exemplary schematic flowchart illustrating a second half part of a series of processes executed by the motor control device according to the first embodiment.

Then, as illustrated in FIG. 8, in the first embodiment, in S801, the filter processing unit 305 of the motor control device 110 executes the filtering process for the crank angle and the motor angle as the detection result of each of the crank angle sensor 131 and the motor angle sensor 132. The filtering process executed in S801 is a process of extracting the vibration component corresponding to the primary frequency of the explosion of the engine 101 from the damper torque as described above.

Then, in S802, the correction amount calculation unit 306 of the motor control device 110 calculates the actual phase difference corresponding to the shift of the phase of the motor torque considering both the torsional torque and the hysteresis torque of the damper 104 based on the difference between two vibration components extracted in S801. The actual phase difference corresponds to an actual phase difference between the crank angle and the motor angle considering influences of both the torsional torque and the hysteresis torque.

In S803, the correction amount calculation unit 306 of the motor control device 110 calculates the reference phase difference by referring to the first map 311 based on the number of revolutions of the engine 101 acquired from the detection result of the crank angle sensor 131 and the shift stage of the transmission 103 acquired from the detection result of the shift position sensor 135.

Then, in S804, the correction amount calculation unit 306 of the motor control device 110 calculates the correction coefficient multiplied by the reference phase difference calculated in S803 by referring to the second map 312 based on the detection result of the engine oil temperature sensor 136 and the detection result of the transmission oil temperature sensor 137.

Then, in S805, the correction amount calculation unit 306 of the motor control device 110 calculates the standard phase difference by multiplying the reference phase difference calculated in S803 by the correction coefficient calculated in S804. As described above, the standard phase difference corresponds to an assumed phase difference between the crank angle and the motor angle considering the influence of only the torsional torque assumed when it is assumed that the hysteresis torque is not generated as described above.

Then, in S806, the correction amount calculation unit 306 of the motor control device 110 calculates the correction phase difference for correcting the reverse-phase torque calculated in S704 based on the difference between the standard phase difference calculated in S805 and the actual phase difference calculated in S802. The correction phase difference corresponds to the shift of the phase of the motor torque generated due to only the hysteresis torque in the damper torque as described above.

Then, in S807, the correction processing unit 307 of the motor control device 110 corrects the reverse-phase torque calculated in S704 by the correction phase difference calculated in S806. As a result, it is possible to calculate the damping torque as the motor torque that may offset the damper torque including even the phase shift caused by the hysteresis torque.

Then, in S808, the command determination unit 308 of the motor control device 110 determines the motor torque command that generates the motor torque according to the damping torque as the reverse phase torque corrected in S807.

Then, in S809, the control unit 309 of the motor control device 110 outputs the motor torque command determined in S808 to the motor generator 102. Then, the process ends.

In the first embodiment, when it is determined that the damping is required in S701, the process proceeds to S810. In addition, in S810, the command determination unit 308 of the motor control device 110 determines a motor torque command that makes the motor torque zero. Then, even in this case, the process proceeds to S809 and in S809, the control unit 309 of the motor control device 110 outputs the motor torque command that makes the motor torque zero, which is determined in S810 to the motor generator 102. Then, the process ends.

As described above, the motor control device 110 according to the first embodiment includes the damper torque calculation unit 302, the reverse-phase torque calculation unit 304, the correction amount calculation unit 306, the command determination unit 308 as a motor torque output unit, and the control unit 309. The damper torque calculation unit 302 calculates, based on the difference between the crank angle and the motor angle, the damper torque including the torsional torque and the hysteresis torque generated by the damper 104 according to the fluctuation in engine torque. The reverse-phase torque calculation unit 304 calculates, based on the damper torque calculated by the damper torque calculation unit 302, the reverse-phase torque with the reverse phase to the damper torque. The correction amount calculation unit 306 calculates a first value corresponding to the phase shift of the motor torque generated due to the hysteresis torque, which is calculated at least based on the crank angle and the motor angle as the correction amount of the phase of the reverse-phase torque. The command determination unit 308 and the control unit 309 output the motor torque command given to the motor generator 102 based on the reverse-phase torque whose phase is corrected by the correction amount calculated by the correction amount calculation unit 306.

According to the motor control device 110 according to the first embodiment, since the influence of the damper torque may be reduced, which includes even the influence of the shift of the phase of the motor torque generated due to the hysteresis torque by the reverse-phase torque corrected with the first value representing the influence of the hysteresis torque alone as the correction amount, vibration generated according to the damper torque may be further reduced.

Here, in the first embodiment, as the motor torque command output unit, the command determination unit 308 and the control unit 309 output the motor torque command when the clutch 105 is in the connection state and output the motor torque command that makes the motor torque zero when the clutch 105 is in the disconnection state. By such a configuration, according to whether the damper torque is transmitted to the wheel W through the clutch 105, whether to generate the motor torque for reducing the influence of the damper torque may be switched.

In the first embodiment, as the motor torque command output unit, the command determination unit 308 and the control unit 309 output the motor torque command that makes the motor torque zero when the acceleration operation is not performed even when the clutch 105 is in the connection state. By such a configuration, when it may be determined that the damper torque is not transmitted to the wheel W by further considering whether the acceleration operation is performed in addition to the state of the clutch 105, the motor torque for reducing the influence of the damper torque may not be generated.

In the first embodiment, the correction amount calculation unit 306 calculates the correction phase difference based on a difference between a standard phase difference corresponding to the phase difference between the crank angle and the motor angle assumed when it is assumed that the hysteresis torque is not generated and an actual phase difference corresponding to a phase difference between the vibration components of the crank angle and the motor angle corresponding to the primary frequency of explosion of the engine 101. According to such a configuration, based on the standard phase difference in which only the influence of the torsional torque is considered without considering the influence of the hysteresis torque, and the actual phase difference in which the influences of both the torsional torque and the hysteresis torque are taken into account, it is possible to easily calculate the correction phase difference that represents the influence of the hysteresis torque.

Then, in the first embodiment, the correction amount calculation unit 306 acquires the reference phase difference based on the number of revolutions of the engine 101 and the shift stage of the transmission 103. According to such a configuration, it is possible to acquire an appropriate standard phase difference in consideration of the number of revolutions of the engine 101 and the shift stage of the transmission 103 that may cause the standard phase difference to be changed.

Then, in the first embodiment, the correction amount calculation unit 306 also acquires the standard phase difference based on the temperature of the oil of the engine 101 and the temperature of the oil of the transmission 103. According to such a configuration, it is possible to acquire a more appropriate standard phase difference by further considering the temperature of the oil of the engine 101 and the temperature of the oil of the transmission 103 that may cause the standard phase difference to be changed.

The motor control device 110 according to the first embodiment further includes the first map 311 representing the relationship between the number of revolutions of the engine 101, the shift stage of the transmission 103, and the reference phase difference that is the basis of the calculation of the standard phase difference and the second map 312 representing the relationship between the temperature of the oil of the engine 101, the temperature of the oil of the transmission 103, and the (first) correction coefficient by which the reference phase difference is multiplied. In addition, the correction amount calculation unit 306 calculates the standard phase difference by multiplying the reference phase difference acquired by referring to the first map 311 based on the number of revolutions of the engine 101 and the shift stage of the transmission 103 by the correction coefficient acquired by referring to the second map 312 based on the temperature of the oil of the engine 101 and the temperature of the oil of the transmission 103. According to such a configuration, the standard phase difference may be easily calculated by using the first map 311 and the second map 312.

Here, a result of simulating the effect of the first embodiment will be described in brief.

Figure 9A:
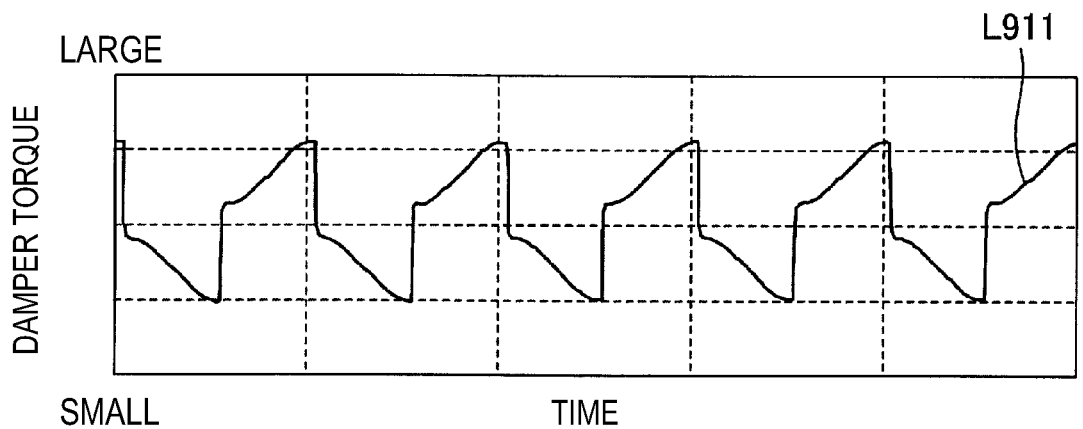
FIGS. 9A to 9C are exemplary schematic diagrams for describing an effect of the first embodiment.
Figure 9B:
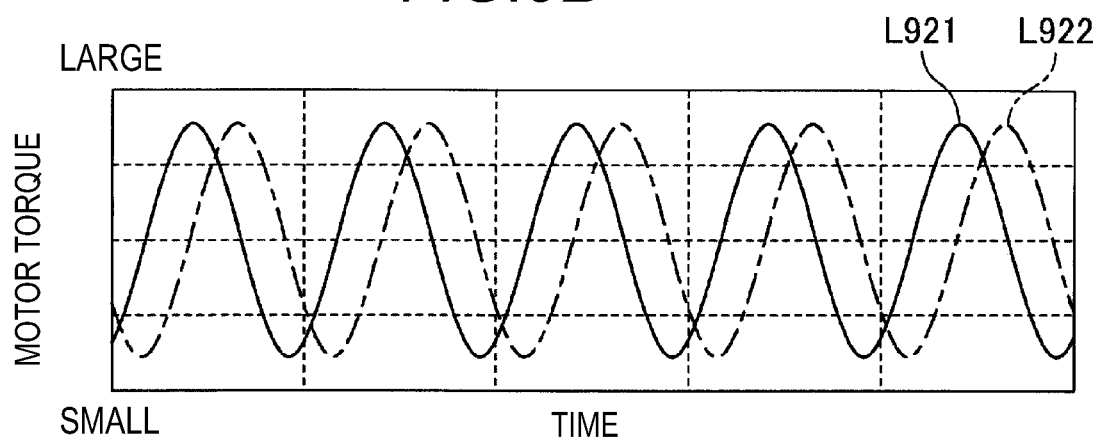
Figure 9C:
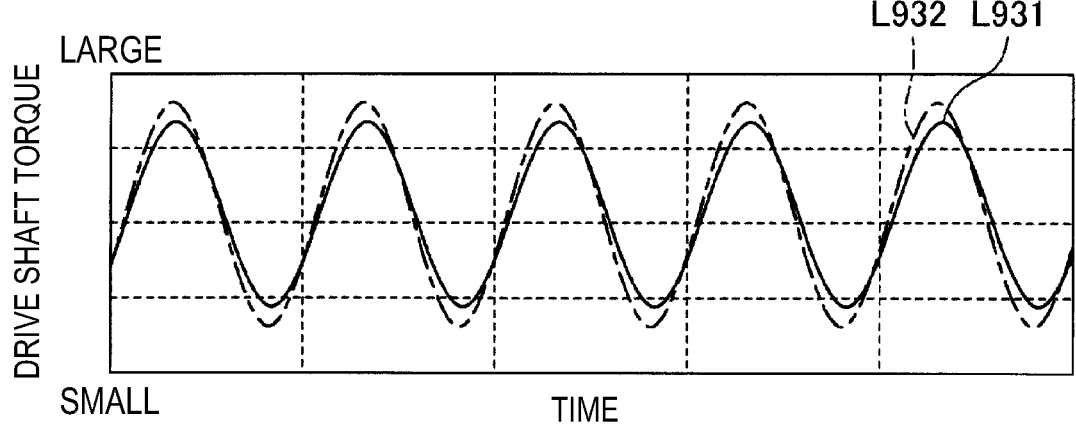

FIGS. 9A to 9C are exemplary schematic diagrams for describing an effect of the first embodiment. The example illustrated in FIGS. 9A to 9C represents a simulation result of comparing a comparative example in which the motor torque not considering the phase shift due to the hysteresis torque is given as the damping torque and the first embodiment in which the motor torque considering the phase shift caused due to the hysteresis torque is given as the damping torque.

A solid line L911 in FIG. 9A corresponds to the time change of the damper torque. Further, a solid line L921 and an alternate long and short dash line L922 in FIG. 9B correspond to the time changes of the motor torque given as the damping torque in the first embodiment and the comparative example, respectively. In addition, a solid line L931 and an alternate long and short dash line L932 in FIG. 9C correspond to the time changes of a drive shaft torque representing vibration generated as a result of giving the motor torque represented by the solid line S921 and the alternate long and short dash line L922 of FIG. 9B, respectively.

A waveform of the solid line S931 in FIG. 9C is based on a superposition of the waveform of the solid line L911 of FIG. 9A and the superposition of the waveform of the solid line L921 of FIG. 9B and the waveform of the alternate long and short dash line L932 in FIG. 9C is based on the superposition of the waveform of the solid line L912 in FIG. 9A and the waveform of the alternate long and short line L922 in FIG. 9B. When the solid line L931 and the alternate long and short dash line L932 are compared with each other, both lines are vibrated, but the vibration of the solid line L931 is smaller in amplitude than the vibration of the alternate long and short dash line L932. Accordingly, in the example illustrated in FIGS. 9A to 9C, in a technology of the first embodiment that gives the motor torque considering the phase shift caused due to the hysteresis torque as the damping torque, it can be seen that the vibration may be reduced than the comparative example of giving the motor torque not considering the shift of the phase caused due to the hysteresis torque as the damping torque.

Second Embodiment

In the first embodiment, the technology has been described, which calculates the correction phase difference corresponding to the shift of the phase of the motor torque generated due to the hysteresis torque based on the difference between the actual phase difference corresponding to the phase difference between the crank angle and the motor angle when both the torsional torque and the hysteresis torque are considered and the standard phase difference corresponding to the phase difference between the crank angle and the motor angle when only the torsional torque is considered by assuming that the hysteresis torque is not generated.

However, as another embodiment, a technology of directly estimating the hysteresis torque and calculating the correction phase difference based on the estimated hysteresis torque may also be considered. Hereinafter, a second embodiment for realizing such a technology will be described. Further, in the following description, a description of a part common to the first embodiment will be appropriately omitted.

Figure 10:
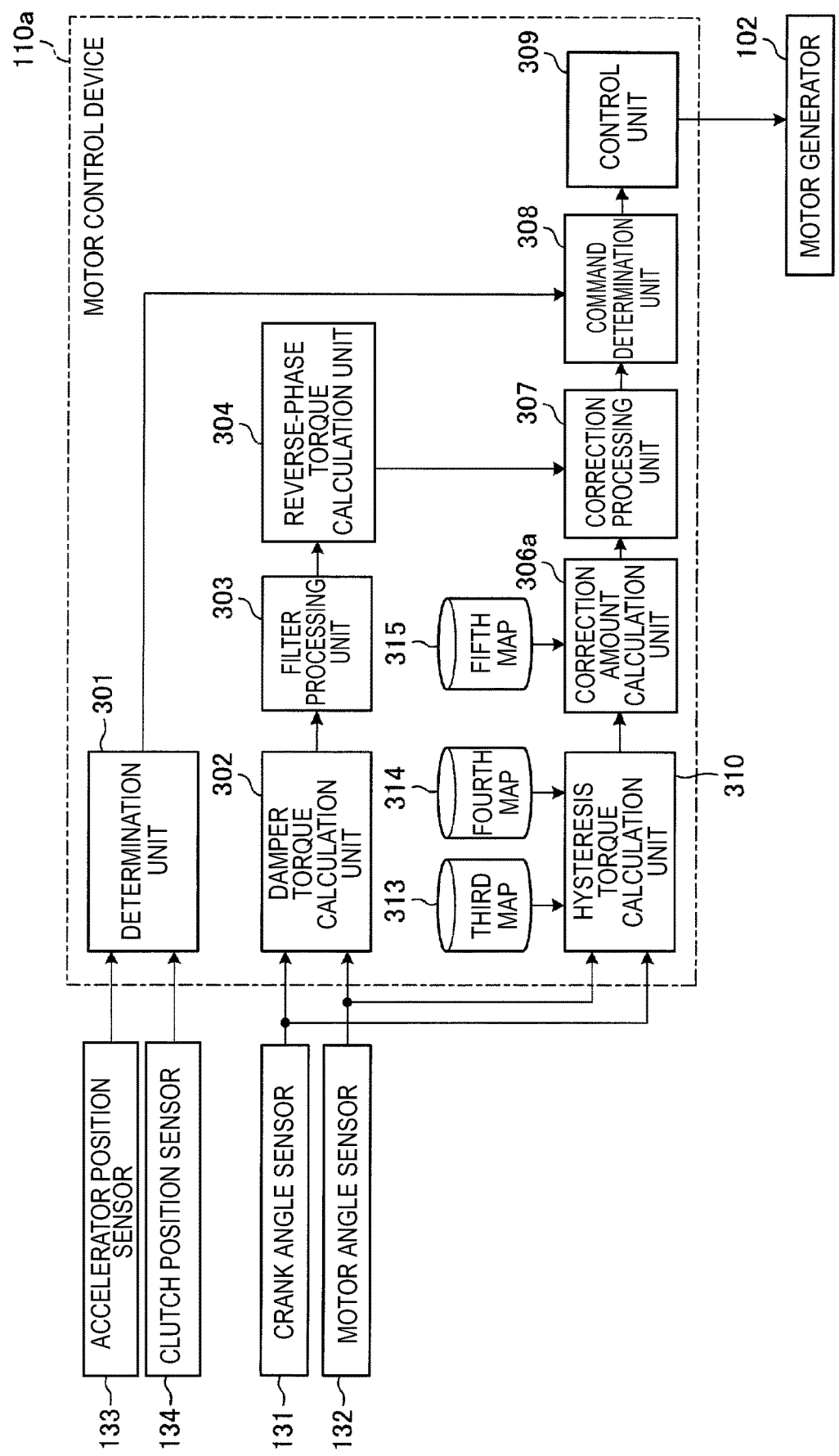
FIG. 10 is an exemplary schematic block diagram illustrating a function module group of a motor control device according to a second embodiment.

FIG. 10 is an exemplary schematic block diagram illustrating a function module group of a motor control device 110a according to the second embodiment. The motor control device 110a is applied to a drive system similarly to the drive system 100 illustrated in FIG. 1.

As illustrated in FIGS. 2A and 2B, the motor control device 110a according to the second embodiment includes a hysteresis torque calculation unit 310, a correction amount calculation unit 306a, a third map 313, a fourth map 314, and a fifth map 315 as a different configuration from the first embodiment (see FIG. 3).

Figure 11:
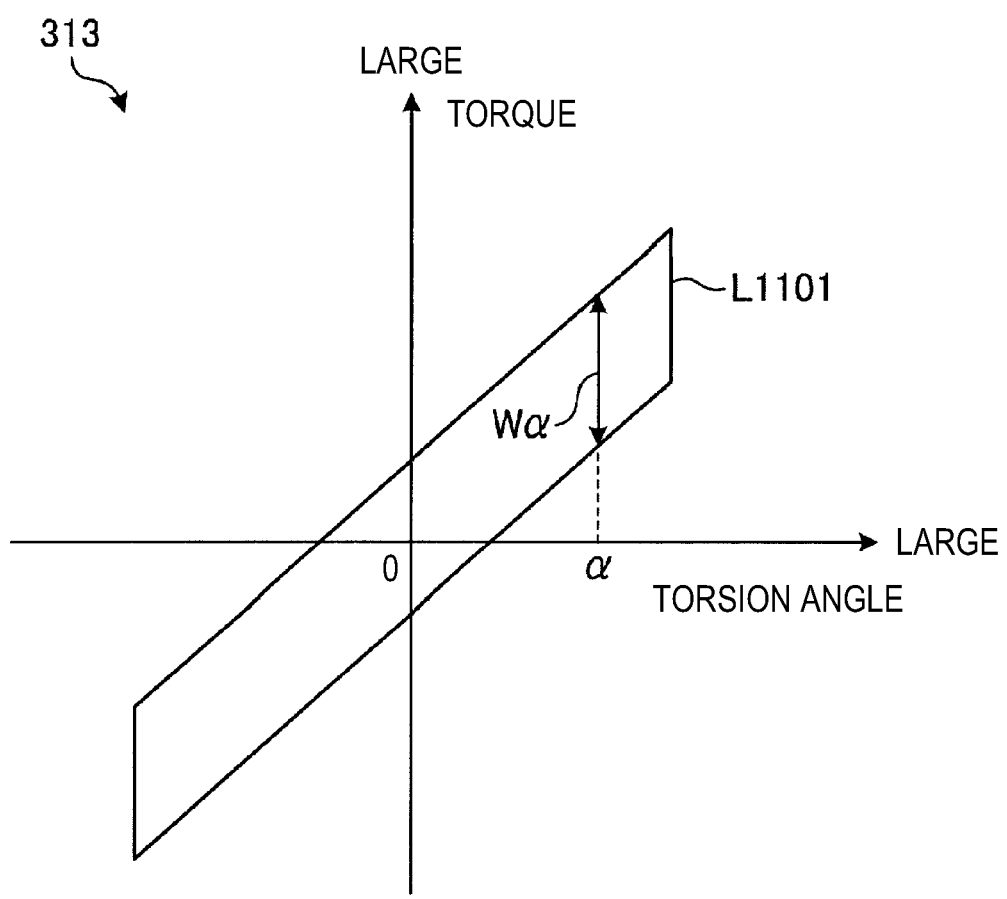
FIG. 11 is an exemplary schematic diagram illustrating an example of a third map according to the second embodiment.
Figure 12:
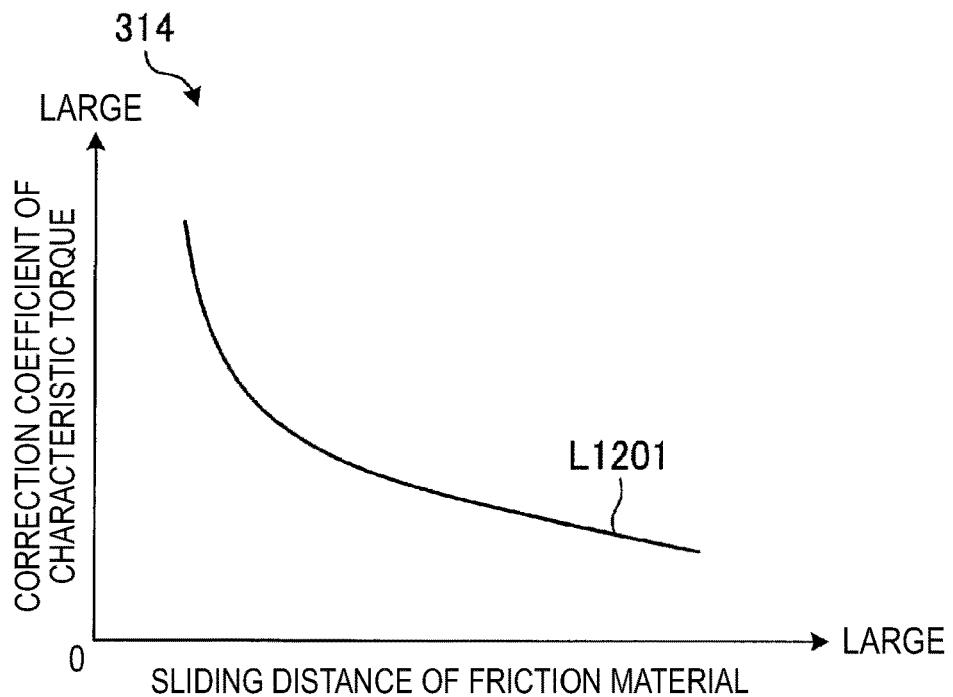
FIG. 12 is an exemplary schematic diagram illustrating an example of a fourth map according to the second embodiment.

The hysteresis torque calculation unit 310 calculates the hysteresis torque based on the detection results of the crank angle sensor 131 and the motor angle sensor 132 and the third map 313 and the fourth map 314 illustrated in FIGS. 11 and 12, respectively.

FIG. 11 is an exemplary schematic diagram illustrating an example of the third map 313 according to the second embodiment. As illustrated in FIG. 11, the third map 313 is predetermined data which represents the relationship between the torsion angle of the damper 104 and the hysteresis torque based on the characteristics of the damper 104, that is, a characteristic torque which a friction material of the damper 104 causes based on the characteristics.

In the example illustrated in FIG. 11, the third map 313 is defined as a closed solid line L1101 representing the hysteresis characteristics of the damper 104. According to the example illustrated in FIG. 11, assuming that the torsion angle of the damper 104 is α, the characteristic torque may be easily calculated by extracting a width Wα of a portion corresponding to α in a region surrounded by the solid line L1101. In the second embodiment, the hysteresis torque may be calculated by correcting the characteristic torque by a (second) correction coefficient calculated based on the fourth map 314 illustrated in FIG. 12 below.

FIG. 12 is an exemplary schematic diagram illustrating an example of the fourth map 314 according to the second embodiment. As illustrated in FIG. 12, the fourth map 314 is predetermined data which represents the relationship between (an integration value of) a sliding distance of the friction material of the damper 104 and the correction coefficient by which the characteristic torque is multiplied.

In the example illustrated in FIG. 12, the relationship between the sliding distance of the friction material of the damper 104 and the correction coefficient by which the characteristic torque is multiplied is defined as a solid line L1201. According to the example illustrated in FIG. 12, the correction coefficient of the characteristic torque may be easily calculated by extracting a point corresponding to the sliding distance of the friction material from the solid line L1201. Here, the sliding distance of the friction material may be calculated by integrating a product of the torsion angle of the damper 104 and a radius of the damper 104 including an amount calculated in the past. In the second embodiment, the hysteresis torque may be calculated by multiplying the characteristic torque by the calculated correction coefficient.

Referring back to FIG. 10, the correction amount calculation unit 306a calculates the correction phase difference for correcting the reverse-phase torque based on the hysteresis torque calculated by the hysteresis torque calculation unit 310. More specifically, the correction amount calculation unit 306a calculates the correction phase difference by referring to the fifth map 315 illustrated in FIG. 13 below based on the hysteresis torque calculated by the hysteresis torque calculation unit 310.

Figure 13:
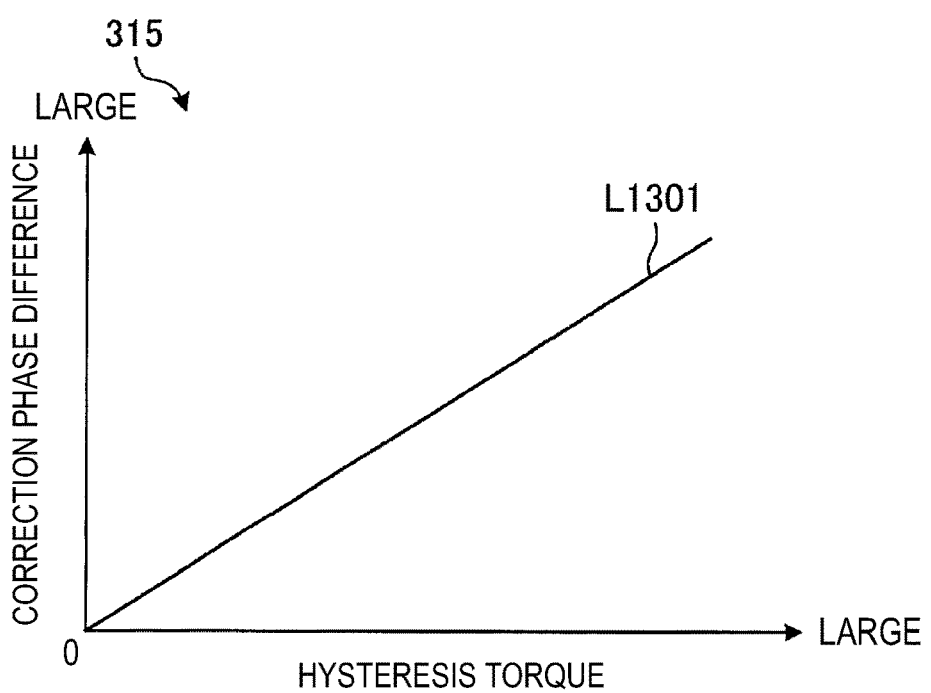
FIG. 13 is an exemplary schematic diagram illustrating an example of a fifth map according to the second embodiment.

FIG. 13 is an exemplary schematic diagram illustrating an example of the fifth map 315 according to the second embodiment. As illustrated in FIG. 13, the fifth map 315 is predetermined data which represents the relationship between the hysteresis torque and the correction phase difference.

In the example illustrated in FIG. 13, the relationship between the hysteresis torque and the correction phase difference is defined as a solid line L1301. According to the example illustrated in FIG. 13, the correction phase difference may be easily calculated by extracting a point corresponding to the hysteresis torque calculated by the hysteresis torque calculation unit 310 from the solid line L1301.

As described above, in the second embodiment, the correction amount calculation unit 306a calculates the correction phase difference based on the characteristic torque obtained by referring to the third map 313 based on the torsion angle as the difference between the crank angle and the motor angle. More specifically, the correction amount calculation unit 306a calculates the correction phase difference based on the hysteresis torque calculated by multiplying the characteristic torque by the correction coefficient obtained by referring to the fourth map 314 based on the sliding distance calculated based on the torsion angle of the damper 104 and the radius of the damper 104.

Other configurations of the motor control device 110a according to the second embodiment are similar to those of the first embodiment (see FIG. 3).

Based on the above configuration, the motor control device 110a according to the second embodiment executes processing according to processing flows described below. Further, since a first half part of a series of processes executed by the motor control device 110a according to the second embodiment are similar to that of the first embodiment (see FIG. 7), only a second half part will be described below.

Figure 14:
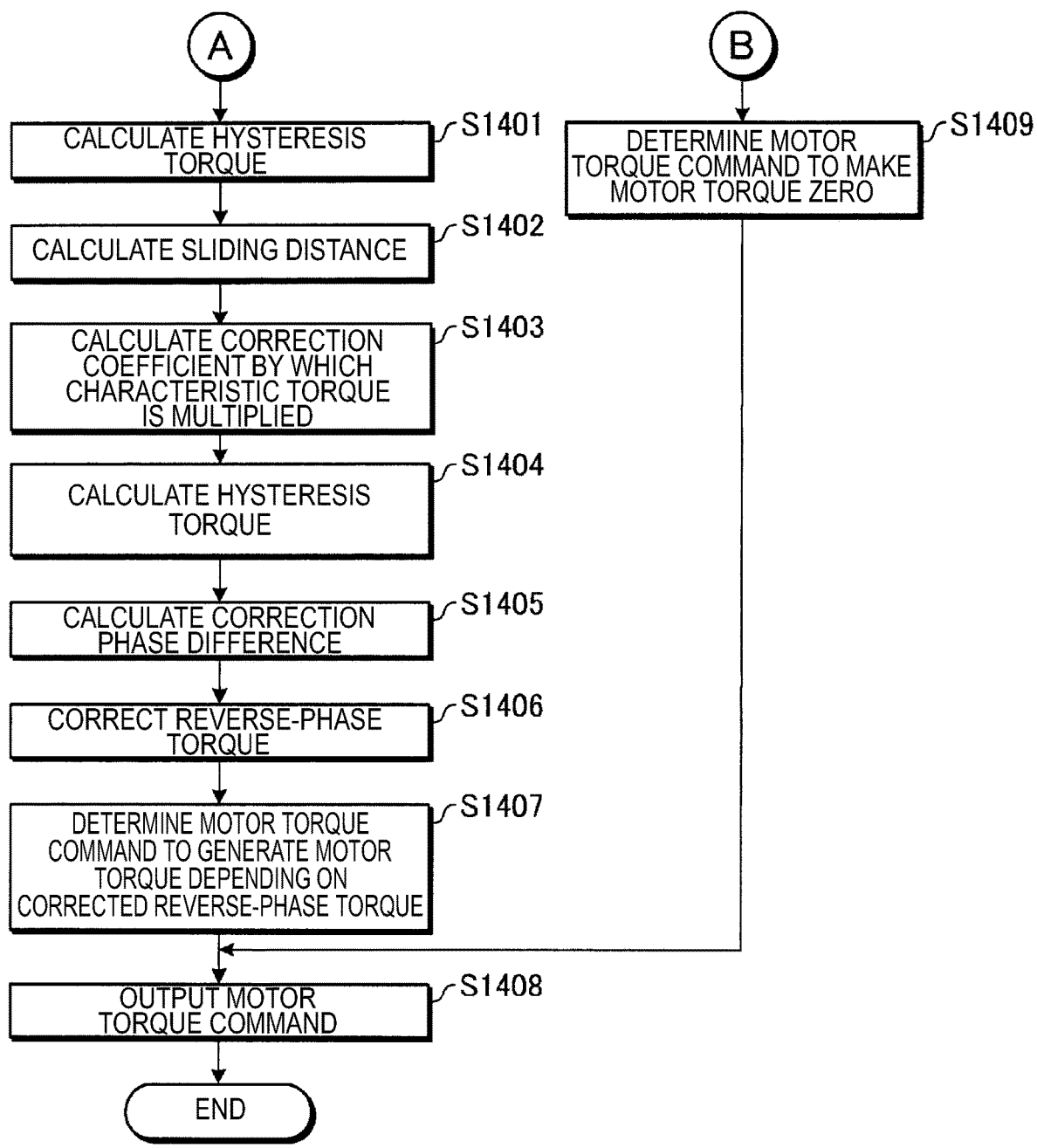
FIG. 14 is an exemplary schematic flowchart illustrating a second half part of a series of processes executed by the motor control device according to the second embodiment.

FIG. 14 is an exemplary schematic flowchart illustrating a second half part of a series of processes executed by the motor control device 110a according to the second embodiment.

As illustrated in FIG. 14, in the second embodiment, in step S1401, the hysteresis torque calculation unit 310 of the motor control device 110a calculates the characteristic torque which the friction material of the damper 104 generates on the characteristics by referring to the third map 313 based on the torsion angle of the damper 104. The torsion angle corresponds to the difference between the crank angle as the detection result of the crank angle sensor 131 and the motor angle as the detection result of the motor angle sensor 132 as described above.

In step S1402, the hysteresis torque calculation unit 310 of the motor control device 110a calculates (the integration value of) the sliding distance of the friction material of the damper 104 by the calculation based on the torsion angle of the damper 104 and the radius of the damper 104.

Then, in S1403, the hysteresis torque calculation unit 310 of the motor control device 110a calculates the correction coefficient by which the characteristic torque calculated in S1401 is multiplied by referring to the fourth map 314 based on the sliding distance calculated in S1402.

Then, in S1404, the hysteresis torque calculation unit 310 of the motor control device 110a calculates the hysteresis torque of the damper 104 by multiplying the characteristic torque calculated in S1401 by the correction coefficient calculated in S1403.

Then, in step S1405, the correction amount calculation unit 306a of the motor control device 110a calculates the correction phase difference for correcting the reverse-phase torque calculated in S704 of FIG. 7 by referring to the fifth map 315 based on the hysteresis torque calculated in step S1403.

Then, in S1406, the correction processing unit 307 of the motor control device 110a corrects the reverse-phase torque calculated in S704 of FIG. 7 by the correction phase difference calculated in S1405. As a result, it is possible to calculate the damping torque as the motor torque that may offset the damper torque including even the phase shift caused by the hysteresis torque.

Then, in S1407, the command determination unit 308 of the motor control device 110a determines the motor torque command that generates the motor torque according to the damping torque as the reverse-phase torque corrected in S1406.

Then, in S1408, the control unit 309 of the motor control device 110a outputs the motor torque command determined in S1407 to the motor generator 102. Then, the process ends.

In the second embodiment, when it is determined that the damping is required in S701 of FIG. 7, the process proceeds to S1409. In addition, in S1409, the command determination unit 308 of the motor control device 110a determines a motor torque command that makes the motor torque zero. Then, even in this case, the process proceeds to S1408 and in S1408, the control unit 309 of the motor control device 110a outputs the motor torque command that makes the motor torque zero, which is determined in S1409 to the motor generator 102. Then, the process ends.

As described above, similarly to the motor control device 110 (see FIG. 3) according to the first embodiment described above, the motor control device 110a according to the second embodiment includes the damper torque calculation unit 302, the reverse-phase torque calculation unit 304, the correction amount calculation unit 306a, the command determination unit 308 as a motor torque output unit, and the control unit 309. Accordingly, even by the second embodiment, similarly to the first embodiment, since the influence of the damper torque may be reduced, which includes even the influence of the shift of the phase of the motor torque generated due to the hysteresis torque by the reverse-phase torque corrected with the first value representing the influence of the hysteresis torque alone as the correction amount, vibration generated according to the damper torque may be further reduced.

However, the motor control device 110a according to the second embodiment further includes the third map 313 representing the relationship between the torsion angle of the damper 104 and the characteristic torque which the friction material of the damper 104 generates based on the characteristics and the correction amount calculation unit 306a calculates the correction phase difference based on the characteristic torque acquired by referring to the third map 313 based on the torsion angle as the difference between the crank angle and the motor angle. According to such a configuration, the correction phase difference representing the influence of the hysteresis torque may be easily calculated based on the characteristics of the damper 104.

The motor control device 110a according to the second embodiment further includes the fourth map 314 representing the relationship between the sliding distance of the friction material of the damper 104 and the (second) correction coefficient by which the characteristic torque is multiplied and the correction amount calculation unit 306a calculates the correction phase difference based on the hysteresis torque calculated by multiplying the characteristic torque by the correction coefficient acquired by referring to the fourth map 314 based on the sliding distance calculated based on the torsion angle of the damper 104 and the radius of the damper 104. According to such a configuration, since the hysteresis torque may be easily calculated by using the fourth map 314, the correction phase difference may be easily calculated.

The motor control device 110a according to the second embodiment further includes the fifth map 315 representing the relationship between the hysteresis torque and the correction phase difference and the correction amount calculation unit 306a calculates the correction phase difference by referring to the fifth map 315 based on the hysteresis torque. According to such a configuration, the correction phase difference depending on the hysteresis torque may be easily calculated by using even the fifth map 315.

A motor control device of a vehicle according to an aspect of this disclosure includes an engine and a motor generator as power sources, a transmission configured to transmit a driving torque based on at least one of an engine torque of a crankshaft of the engine and a motor torque of a motor shaft of the motor generator to a wheel at a selected gear ratio, and a damper configured to reduce vibration of the crankshaft by an elastic member and a friction material, the motor control device including: a damper torque calculation unit configured to calculate a damper torque including a torsional torque and a hysteresis torque generated by the damper according to fluctuation in engine torque based on a difference between a crank angle as a rotation angle of the crankshaft and a motor angle as a rotation angle of the motor shaft; a reverse-phase torque calculation unit configured to calculate a reverse-phase torque with a reverse phase to the damper torque based on the damper torque; a correction amount calculation unit configured to calculate a first value corresponding to a phase shift of the motor torque generated due to the hysteresis torque, which is calculated at least based on the crank angle and the motor angle as a correction amount of the phase of the reverse-phase torque; and a motor torque command output unit configured to output a motor torque command given to the motor generator based on the reverse-phase torque whose phase is corrected by the correction amount.

According to the motor control device, since the influence of the damper torque may be reduced, which includes even the influence of the shift of the phase of the motor torque generated due to the hysteresis torque by the reverse-phase torque corrected with the first value representing the influence of the hysteresis torque alone as the correction amount, vibration generated according to the damper torque may be further reduced.

In the motor control device, the motor torque command output unit may output the motor torque command when a clutch installed between the engine and the transmission is in a connection state where the crankshaft of the engine and an input shaft of the transmission are connected, and output the motor torque command that makes the motor torque zero when the clutch is in a disconnection state where the connection of the crankshaft and the input shaft is disconnected. According to such a configuration, according to whether the damper torque is transmitted to the wheel through the clutch, whether to generate the motor torque for reducing the influence of the damper torque may be switched.

In this case, the motor torque command output unit may output the motor torque command that makes the motor torque zero when an acceleration operation of accelerating the vehicle is not performed even when the clutch is in the connection state. According to such a configuration, when the damper torque is not transmitted to the wheel by further considering whether the acceleration operation is performed in addition to the state of the clutch, the motor torque for reducing the influence of the damper torque may not be generated.

In the motor control device, the correction amount calculation unit may calculate the first value based on a difference between a second value corresponding to a phase difference between the crank angle and the motor angle estimated when it is assumed that the hysteresis torque is not generated, and a third value corresponding to a phase difference between vibration components of the crank angle and the motor angle corresponding to a primary frequency of explosion of the engine. According to such a configuration, based on the second value in which only the influence of the torsional torque is considered without considering the influence of the hysteresis torque, and the third value in which the influences of both the torsional torque and the hysteresis torque are considered, it is possible to easily calculate the first value that represents the influence of the hysteresis torque.

In this case, the correction amount calculation unit may acquire the second value based on the number of revolutions of the engine and a shift stage of the transmission. According to such a configuration, an appropriate second value may be acquired by considering the number of revolutions of the engine and the shift stage of the transmission which may cause the second value to be changed.

In the configuration of acquiring the second value based on the number of revolutions of the engine and the shift stage of the transmission, the correction amount calculation unit may acquire the second value further based on a temperature of an oil of the engine and a temperature of an oil of the transmission. According to such a configuration, a more appropriate second value may be acquired by considering the temperature of the oil of the engine and the temperature of the oil of the transmission which may cause the second value to be changed.

In this case, the motor control device may further include: a first map representing a relationship among the number of revolutions of the engine, the shift stage of the transmission, and a fourth value that serves as a basis of calculation of the second value; and a second map representing a relationship between the temperature of the oil of the engine, the temperature of the oil of the transmission, and a first correction coefficient by which the fourth value is multiplied, in which the correction amount calculation unit may calculate the second value by multiplying the fourth value acquired by referring to the first map based on the number of revolutions of the engine and the shift stage of the transmission by the first correction coefficient acquired by referring to the second map based on the temperature of the oil of the engine and the temperature of the oil of the transmission. According to such a configuration, the second value may be easily calculated by using the first map and the second map.

The motor control device may further include: a third map representing a relationship between a torsion angle of the damper and a characteristic torque characteristically generated by the friction material of the damper, in which the correction amount calculation unit may calculate the first value based on the characteristic torque acquired by referring to the third map based on the torsion angle as the difference between the crank angle and the motor angle. According to such a configuration, the first value representing the influence of the hysteresis torque may be easily calculated based on the characteristics of the damper.

In this case, the motor control device may further include: a fourth map representing a relationship between a sliding distance of the friction material of the damper and a second correction coefficient by which the characteristic torque is multiplied, in which the correction amount calculation unit may calculate the first value based on the hysteresis torque calculated by multiplying the characteristic torque by the second correction coefficient acquired by referring to the fourth map based on the sliding distance calculated by the torsion angle and a radius of the damper. According to such a configuration, since the hysteresis torque may be easily calculated by using the fourth map, the first value may be easily calculated.

The motor control device including the fourth map may further include: a fifth map representing a relationship between the hysteresis torque and the first value, in which the correction amount calculation unit calculates the first value by referring to the fifth map based on the hysteresis torque. According to such a configuration, the first value depending on the hysteresis torque may be easily calculated by using even the fifth map.

Although some embodiments of this disclosure have been described above, the embodiment and the modified example are just examples and it is not intended that limit the scope of this disclosure. The new embodiments may be implemented as various other forms and various omission, substitutions, and changes can be made within the range without departing from the gist of this disclosure. The embodiments or the modifications thereof are included in the scope or the gist of this disclosure and included in a range equivalent to this disclosure disclosed in the range of the claims.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A motor control device of a vehicle including an engine and a motor generator as power sources, a transmission configured to transmit a driving torque based on at least one of an engine torque of a crankshaft of the engine and a motor torque of a motor shaft of the motor generator to a wheel at a selected gear ratio, and a damper configured to reduce vibration of the crankshaft by an elastic member and a friction material, the motor control device comprising:
- a damper torque calculation unit configured to calculate a damper torque including a torsional torque and a hysteresis torque generated by the damper according to fluctuation in engine torque based on a difference between a crank angle as a rotation angle of the crankshaft and a motor angle as a rotation angle of the motor shaft;
- a reverse-phase torque calculation unit configured to calculate a reverse-phase torque with a reverse phase to the damper torque based on the damper torque;
- a correction amount calculation unit configured to calculate a first value corresponding to a phase shift of the motor torque generated due to the hysteresis torque, which is calculated at least based on the crank angle and the motor angle as a correction amount of the phase of the reverse-phase torque; and
- a motor torque command output unit configured to output a motor torque command given to the motor generator based on the reverse-phase torque whose phase is corrected by the correction amount.

2. The motor control device according to claim 1, wherein the motor torque command output unit outputs the motor torque command when a clutch installed between the engine and the transmission is in a connection state where the crankshaft of the engine and an input shaft of the transmission are connected, and outputs the motor torque command that makes the motor torque zero when the clutch is in a disconnection state where the connection of the crankshaft and the input shaft is disconnected.

3. The motor control device according to claim 2, wherein the motor torque command output unit outputs the motor torque command that makes the motor torque zero when an acceleration operation of accelerating the vehicle is not performed even when the clutch is in the connection state.

4. The motor control device according to claim 1, wherein the correction amount calculation unit calculates the first value based on a difference between a second value corresponding to a phase difference between the crank angle and the motor angle estimated when it is assumed that the hysteresis torque is not generated, and a third value corresponding to a phase difference between vibration components of the crank angle and the motor angle corresponding to a primary frequency of explosion of the engine.

5. The motor control device according to claim 4, wherein the correction amount calculation unit acquires the second value based on the number of revolutions of the engine and a shift stage of the transmission.

6. The motor control device according to claim 5, wherein the correction amount calculation unit acquires the second value further based on a temperature of an oil of the engine and a temperature of an oil of the transmission.

7. The motor control device according to claim 6, further comprising:
- a first map representing a relationship among the number of revolutions of the engine, the shift stage of the transmission, and a fourth value that serves as a basis of calculation of the second value; and
- a second map representing a relationship among the temperature of the oil of the engine, the temperature of the oil of the transmission, and a first correction coefficient by which the fourth value is multiplied,
- wherein the correction amount calculation unit calculates the second value by multiplying the fourth value acquired by referring to the first map based on the number of revolutions of the engine and the shift stage of the transmission by the first correction coefficient acquired by referring to the second map based on the temperature of the oil of the engine and the temperature of the oil of the transmission.

8. The motor control device according to claim 7, further comprising:
- a third map representing a relationship between a torsion angle of the damper and a characteristic torque characteristically generated by the friction material of the damper,
- wherein the correction amount calculation unit calculates the first value based on the characteristic torque acquired by referring to the third map based on the torsion angle as the difference between the crank angle and the motor angle.

9. The motor control device according to claim 8, further comprising:
- a fourth map representing a relationship between a sliding distance of the friction material of the damper and a second correction coefficient by which the characteristic torque is multiplied,
- wherein the correction amount calculation unit calculates the first value based on the hysteresis torque calculated by multiplying the characteristic torque by the second correction coefficient acquired by referring to the fourth map based on the sliding distance calculated by the torsion angle and a radius of the damper.

10. The motor control device according to claim 9, further comprising:
- a fifth map representing a relationship between the hysteresis torque and the first value,
- wherein the correction amount calculation unit calculates the first value by referring to the fifth map based on the hysteresis torque.

* * * * *